(12) United States Patent
Cramer et al.

(10) Patent No.: US 7,707,263 B1
(45) Date of Patent: Apr. 27, 2010

(54) SYSTEM AND METHOD FOR ASSOCIATING A NETWORK ADDRESS WITH A STORAGE DEVICE

(75) Inventors: Samuel M. Cramer, Sunnyvale, CA (US); Joydeep sen Sarma, Mountainview, CA (US); Richard O. Larson, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 764 days.

(21) Appl. No.: 10/138,918

(22) Filed: May 3, 2002

(51) Int. Cl.
G06F 15/16 (2006.01)
(52) U.S. Cl. ............... 709/212; 709/203; 709/201; 709/223; 709/220; 709/204
(58) Field of Classification Search ......... 709/203, 709/201, 21, 220, 223, 204, 212
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,854,901 A * | 12/1998 | Cole et al. | 709/245 |
| 5,931,918 A | 8/1999 | Row et al. | |
| 5,941,972 A | 8/1999 | Hoese et al. | |
| 5,963,962 A | 10/1999 | Hitz et al. | |
| 6,065,037 A | 5/2000 | Hitz et al. | |
| 6,243,759 B1 * | 6/2001 | Boden et al. | 709/238 |
| 6,289,356 B1 | 9/2001 | Hitz et al. | |
| 6,425,035 B2 | 7/2002 | Hoese et al. | |
| 6,574,667 B1 * | 6/2003 | Blumenau et al. | 709/229 |
| 6,581,102 B1 * | 6/2003 | Amini et al. | 709/231 |
| 6,591,306 B1 * | 7/2003 | Redlich | 709/245 |
| 6,621,820 B1 * | 9/2003 | Williams et al. | 370/395.31 |
| 6,636,499 B1 * | 10/2003 | Dowling | 370/338 |
| 6,718,383 B1 * | 4/2004 | Hebert | 709/224 |
| 6,799,255 B1 * | 9/2004 | Blumenau et al. | 711/152 |
| 6,810,396 B1 * | 10/2004 | Blumenau et al. | 707/5 |
| 6,870,852 B1 * | 3/2005 | Lawitzke | 370/401 |
| 6,920,580 B1 | 7/2005 | Cramer et al. | |
| 7,079,499 B1 * | 7/2006 | Akhtar et al. | 370/310 |

(Continued)

OTHER PUBLICATIONS

Request for Comments (RFC) 826: An Ethernet Address Resolution Protocol, Internet Engineering Task Force (IFTF), Nov. 1982.

(Continued)

*Primary Examiner*—Thu Nguyen
*Assistant Examiner*—Lan-Dai T Truong
(74) *Attorney, Agent, or Firm*—Cesari and McKenna, LLP

(57) ABSTRACT

A system and method for associating a network address with a volume, individual disk or collection of disks in a network storage system. Identifying information is stored on each volume or disk so that a file server can map a network address to a MAC address associated with a particular network interface controller of a file server. Input/output operations directed to the network address associated with a particular volume or disk is directed to the file server that is currently managing that volume or disk. In a system utilizing these address associated volumes, the name and address of data does not change as different file servers manage a particular volume or disk.

13 Claims, 11 Drawing Sheets

U.S. PATENT DOCUMENTS

| | | | |
|---|---|---|---|
| 7,296,068 B1 | 11/2007 | Sarma et al. | |
| 2002/0023150 A1* | 2/2002 | Osafune et al. | 709/221 |
| 2002/0120706 A1* | 8/2002 | Murphy | 709/208 |
| 2002/0138628 A1* | 9/2002 | Tingley et al. | 709/227 |
| 2002/0143946 A1* | 10/2002 | Crosson | 709/226 |
| 2002/0147774 A1* | 10/2002 | Lisiecki et al. | 709/203 |
| 2002/0165906 A1* | 11/2002 | Ricart et al. | 709/203 |
| 2003/0023784 A1* | 1/2003 | Matsunami et al. | 710/36 |
| 2003/0088700 A1* | 5/2003 | Aiken | 709/245 |
| 2003/0101109 A1* | 5/2003 | Kaneda et al. | 705/28 |
| 2003/0115324 A1* | 6/2003 | Blumenau et al. | 709/225 |
| 2003/0120743 A1 | 6/2003 | Coatney et al. | |
| 2003/0126118 A1* | 7/2003 | Burton et al. | 707/3 |
| 2003/0131207 A1* | 7/2003 | Arakawa et al. | 711/162 |
| 2003/0177206 A1* | 9/2003 | Whitlow | 709/220 |
| 2006/0265529 A1* | 11/2006 | Kuik et al. | 710/62 |
| 2007/0012931 A1* | 1/2007 | Lee et al. | 257/89 |
| 2007/0112931 A1* | 5/2007 | Kuik et al. | 709/216 |

OTHER PUBLICATIONS

Common Internet File System (CIFS) Version: CIFS-Spec 0.9, Storage Networking Industry Association (SNIA), Draft SNIA CIFS Documentation Work Group Work-In-Progress, Revision Date: Mar. 26, 2001.

* cited by examiner

SYSTEM AND METHOD FOR ASSOCIATING A NETWORK ADDRESS WITH A STORAGE DEVICE

FIELD OF THE INVENTION

The present invention relates to networked storage systems, and more particularly to accessing files in a networked storage system.

BACKGROUND OF THE INVENTION

A file server is a computer that provides file service relating to the organization of information on storage devices, such as disks. The file server or filer includes a storage operating system that implements a file system to logically organize the information as a to hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as Modes and data blocks, on disk are typically fixed. An Mode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optiis mal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a storage system that manages data access, and, in the case of filers, implements file system semantics (such as the above-referenced WAFL). In this sense, ONTAP software is an example of such a storage operating system implemented as a microkernel. The storage operating system can also be implemented as an application program operating over a general-purpose operating system, such as UNIX or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a is single disk) arranged according to a RAID 4, or equivalent high-reliability, implementation.

More than one filer can reside on a single network (LAN, WAN, etc.), for access by network-connected clients and servers. Where multiple filers are present on the network, each filer may be assigned responsibility for a certain set of volumes. The filers may be connected in a cluster using a separate physical interconnect or linking communication protocol that passes over the network (e.g. the LAN, etc.). In the event of a failure or shutdown of a given filer, its volume set can be reassigned to another filer in the cluster to maintain continuity of service. In the case of a shutdown, various failover techniques are employed to preserve and restore file service, as described generally in commonly owned U.S. patent application Ser. No. 09/933,883 entitled OPERATED INITIATED GRACEFUL TAKEOVER IN A NODE CLUSTER by Naveen Bali et al and U.S. patent application Ser. No. 09/625,234 entitled NEGOTIATING TAKEOVER IN HIGH AVAILABILITY CLUSTER by Samuel M. Cramer et al., the teachings of which are expressly incorporated herein by reference. Such techniques involve (a) the planned and unplanned takeover of a filer's volumes by a cluster partner filer upon filer shutdown; and (b) the giveback of the taken-over volumes by relinquishing control by the cluster partner filer. A management station can also reside on the network, as a specialized client that includes storage management software used by a system administrator to manipulate and control the storage-handling by networked filers.

A filer can be made more reliable and stable in the event of a system shutdown or other unforeseen problem by employing a backup memory consisting of a non-volatile random access memory (NVRAM). An NVRAM is typically a large-volume solid-state memory array (RAM) having either a backup battery, or other built-in last-state-retention capabilities (e.g. a FLASH memory), that holds the last state of the memory in the event of any power loss to the storage system.

A filer is typically made more reliable and stable in the event of a system shutdown or unforeseen problem by employing a backup memory consisting of a non-volatile random access memory NVRAM. An NVRAM is typically a large-volume, solid-state memory array (RAM) having either a backup battery, or other built-in last-state-retention capabilities (e.g. a FLASH memory), that holds the last state of the memory in the event is of any power loss to the storage system. In a known implementation, each client transaction request processed by the storage operating system is logged to the NVRAM as a journal entry. The NVRAM is loaded with requests until such time as a consistency point (CP) is reached. CPs occur at fixed time intervals, or when other key events arise. In the event of a fault, power loss, or other interruption in the normal flow of information among the client, storage operating system, and the disks, the NVRAM log is replayed to re-perform any requests logged therein for its own filer (and an associated cluster partner filer, if any) between the last CP and an interruption in storage handling. In addition, the log is replayed during reboot. Each time a CP occurs, the requests logged in the NVRAM are subsequently overwritten or otherwise cleared, once the results of the requests are written from the filer's conventional RAM buffer cache to disk. Immediately thereafter, the NVRAM is available for the logging of new requests.

In the event of a shutdown, power failure or other system problem, which interrupts the normal flow of information among the client, storage operating system, and the disks, the NVRAM can be used to recover information logged since the last CP prior to the interruption event.

Computer networks are typically composed of computers that communicate with each other through specific protocols. Each computer or device attached to a network is assigned at least one network-unique name, i.e. a network address. Any device in the network can manage files that are stored on devices which are locally accessible to that device. Additionally, a network device could require access to files that are managed by other network devices within the network.

In known file system implementations, local files—those files which are stored on devices locally accessible to a network device—are identified by a device name and a file name. For example, in a Microsoft Windows® compatible device, a file may be identified by "C:/foo/bar/file.doc." In this example the device is called C:, which is the name of a disk connected to the Microsoft Windows machine. The file name identifies the directory structure and individual file to be accessed. In this example, the file "file.doc" is stored in the "bar" subdirectory of the "foo" directory. This combination produces a unique file identifier for those files which are locally accessible. Files which are accessed via the network, i.e. non-local files, are identified by the device name and file name as local files are, but are further identified by the address of the computer or network device that manages that file. This combination of network address, device name, and file name produces a network-unique identifier for a particular file.

As part of a network storage system, clients request the services of a filer's file system, i.e. making a data access request, by issuing file system protocol messages (in the form of packets) to the filer over the network. The filer fulfills a data access request by locating and packaging the data, and then sending the data through the network back to the requesting client. In known implementations, the data access request identifies the data through an identifier that contains the network address of the filer, for example "1.2.3.4:C:/foo/bar/file.doc." In this example, the file named "file.doc" is located in the "/foo/bar" directory on drive C: of the filer whose network address is 1.2.3.4. The data that the client has requested could be physically located anywhere in the network, on any of the possible storage devices accessible through any file server.

A noted disadvantage of prior implementations arises for a client when a filer is taken out the network, and its network address becomes unavailable to other computers or network devices connected to the network. It is possible to reconnect the storage devices that a particular file server manages to another filer, but in doing so, the data identification must change to the network address of the new filer in order to properly locate the data managed by the filer which has been taken out of the network. This change of the data identification can be inconvenient and time-consuming, especially considering that a filer can be taken off of the network for many reasons, including filer upgrade, scheduled maintenance, or unexpected system failure. The ability to transparently access network data before, during, and after storage device reconfiguration to a new filer could vastly increase configuration flexibility and data accessibility, and could decrease downtime resulting from filer or other server failure.

In addition, with the growing demand for electronic file availability comes the challenge of backing up and restoring storage devices that can have extremely large storage capacities. To reduce the downtime associated with the back-up/restore operation, administrators often resort to imposing limits on storage and enforcing quotas. Faster back-up/restore capabilities and more flexibility in terms of adding storage devices can both reduce downtime and decrease the numbers of restrictions imposed on users of the system. Accordingly, the potential inaccessibility of data described above is another disadvantage that impedes these advantageous goals.

Accordingly, it is an object of the invention to provide for a system and method for associating network addresses with volumes so that clients can seamlessly and transparently address I/O operations to the specified network address for a given volume without concern for the network address of the file server managing the particular volume.

SUMMARY OF THE INVENTION

This invention overcomes the disadvantages of the prior art by providing a system and method for identification of a storage device by an IP address, or similar networkbased address. Thus, each storage device is network accessible by all devices connected to the network without regard to the identity of the storage device's file management system. The storage device is associated with one or more IP addresses. According to an aspect of the invention, the IP address and other configuration information is stored at a predetermined location on the storage device itself for access by filers, thereby permitting the storage device to be portable among various filers. Each filer or other network device in a network obtains the IP address of an IP volume. I/O operations to that volume are then directed to the IP address of the particular volume. This IP addressing permits the filer that is managing a particular volume to be changed so that the transfer is transparent to a client accessing data on a volume.

In accordance with one embodiment of the invention, the network address of a volume is mapped to the machine address code (MAC) address of a network interface controller (NIC) of the file server that is currently managing the volume.

Thus, I/O requests that are directed to the network address of the volume are redirected to the appropriate file server for processing.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Networks and File Servers

Figure 1:
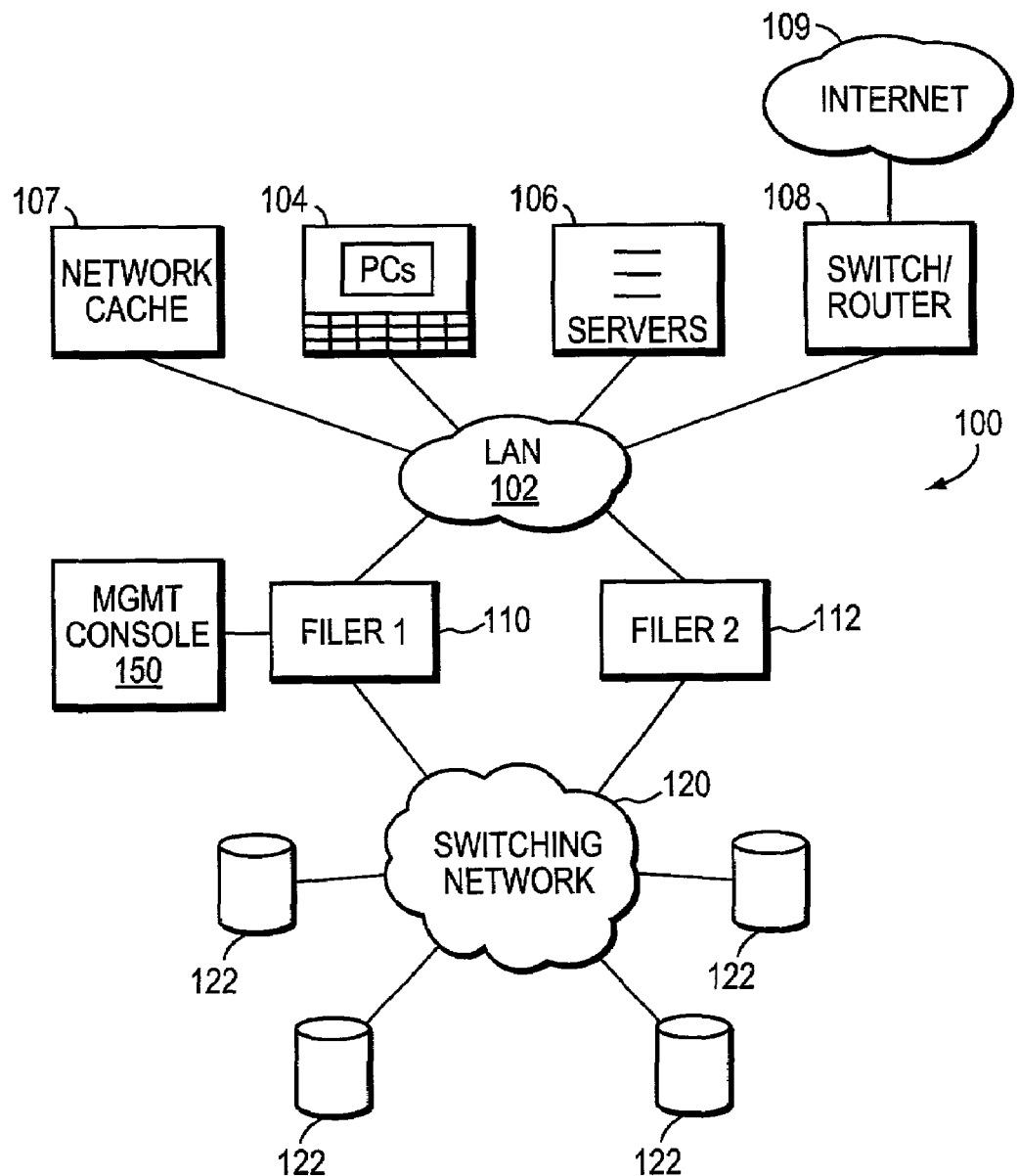
FIG. 1 is a block diagram of an exemplary network environment.

FIG. 1 is a schematic block diagram of an exemplary network environment 100 in which the principles of the present invention are implemented. The network 100 is based around a local area network (LAN) interconnection 102. However, a wide area network (WAN), virtual private network (VPN) implementation (utilizing communication links over the Internet, for example), or a combination of LAN, WAN and VPN implementations can be established. For the purposes of this description, the term "LAN" should be taken broadly to include any acceptable networking architecture. The LAN 102 interconnects various clients based upon personal computers (PCs) 104, servers 106 and a network cache 107. Other network based devices such as X-terminals, workstations and the like can also be connected to the LAN. Also interconnected to the LAN may be a switch/router 108 that provides a gateway to the well-known Internet 109, thereby enabling various networked devices to transmit and receive internet based information, including e-mail, web content, and the like.

In addition exemplary file servers (or "filers") 110 and 112 (Filer 1 and Filer 2, respectively) are connected to the LAN. These filers, (described further below) are configured to control storage of, and access to, data in a set of interconnected storage volumes 122.

Each of the devices attached to LAN include an appropriate, conventional network interface arrangement (not shown) for communicating over the LAN using desired communication protocols, such as the well-known Transport Control Protocol/Internet Protocol (TCP/IP), User Datagram Protocol (UDP), Hypertext Transfer Protocol (HTTP) or Small Network Management Protocol (SNMP).

While the invention is described herein in reference to a filer or a cluster of filers, the teachings of this invention can be adapted to a variety of storage system architectures including, but not limited to, a network-attached storage environment, a storage area network and disk assembly directly-attached to a client/host computer. The term "storage system" should therefore be taken broadly to include such arrangements. It is expressly contemplated that the various processes, architectures and procedures described herein can be implemented in hardware, firmware or software, consisting of a computer-readable medium including program instructions that perform a series of steps. Moreover, while the invention is described herein in reference to file-based storage, it can be employed in other data storage schemas, such as block-based storage systems. Additionally, it should be noted that the term "volume" can also be defined to include a logical unit number (LUN) that designates one or more disks.

Note that each filer can also be provided with a graphical user interface/console 150 so that instructions from an operator can be entered directly to the filer while generally bypassing the LAN or other network.

Figure 2:
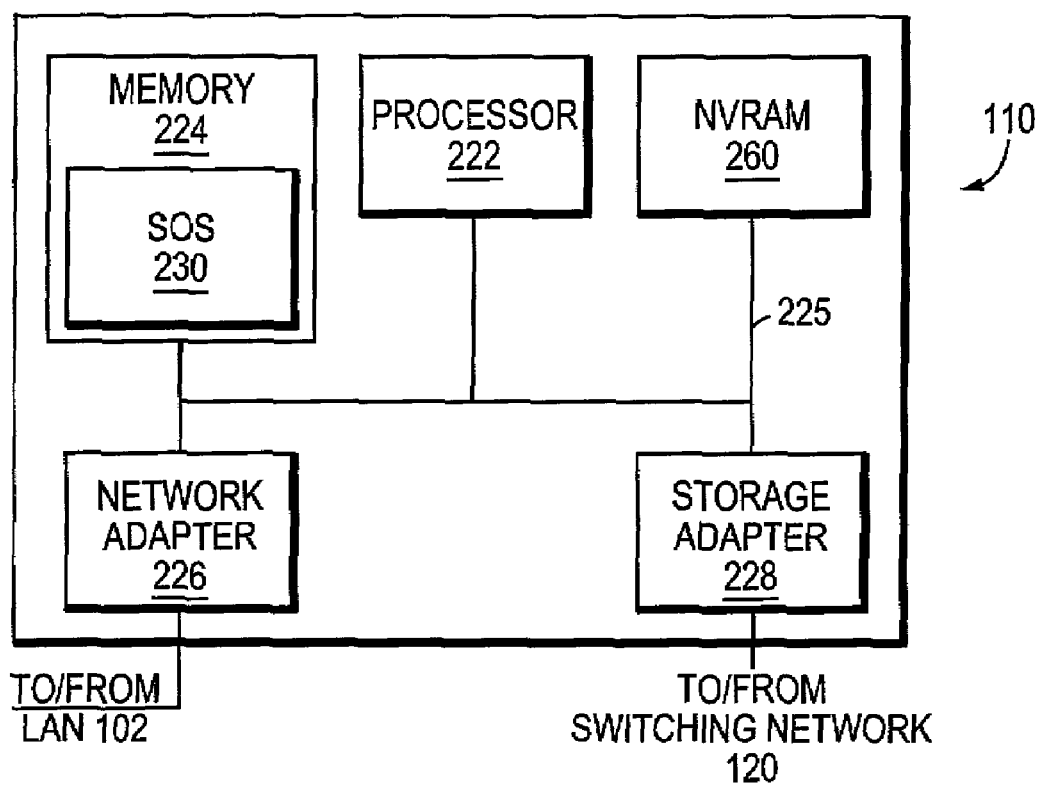
FIG. 2 is a schematic block diagram of an exemplary file server.

An exemplary file server, or filer, architecture is now described in further detail. FIG. 2 is a more-detailed schematic block diagram of the exemplary file server 110 (Filer 1) implemented as a network storage appliance, such as the NetApp® filer available from Network Appliance, that can execute the above-described Data ONTAP™ software and is advantageously used with the present invention. Other filers can have similar construction (including exemplary Filer 2 (112). By way of background, a network storage appliance is a special-purpose computer that provides file service relating to the organization of information on storage devices, such as disks. However, it will be understood by those skilled in the art that the inventive concepts described herein may apply to any type of filer whether implemented as a special-purpose or general-purpose computer, including a standalone computer. The filer 110 comprises a processor 222, a memory 224, a network adapter 226 and a storage adapter 228 interconnected by a system bus 225. The filer 110 also includes a storage operating system 230 that implements a file system to logically organize the information as a hierarchical structure of directories and files on the disks.

In the illustrative embodiment, the memory 224 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system 230, portions of which are typically resident in memory and executed by the processing elements, functionally organizes the filer 110 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the filer 110 to a client 104 (including, for example, but not limited to, management station 140) (see FIG. 1) over the computer network (LAN 102), which, as described generally above, can comprise a point-to-point connection or a shared medium, such as a local area network. A client (104, 140) can be a general-purpose computer configured to execute applications including file system protocols, such as the Common Internet File System (CIFS) protocol. Moreover, the client can interact with the filer 110 in accordance with a client/server model of information delivery. That is, the client may request the services of the filer, and the filer may return the results of the services requested by the client, by exchanging packets that conform to, e.g., the CIFS protocol format over the network 102. The format of the CIFS protocol packet exchanged over the network is well-known and described in *Common Internet File System (CIFS) Version: CIFS-Spec* 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 228 cooperates with the storage operating system 230 executing on the filer to access information requested by the client, which information may be stored on a number of storage volumes 122. The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself) prior to being forwarded over the system bus 225 to the network adapter 226, where the information is formatted into a packet and returned to the client 110.

Notably, the exemplary filer 110 includes an NVRAM 260 that provides faulttolerant backup of data, enabling the integrity of filer transactions to survive a service interruption based upon a power failure, or other fault. The NVRAM 260 is typically made sufficiently large to log a certain time-based chunk of transactions (for example, several seconds worth). The NVRAM entry may be constructed in parallel with execution of the corresponding request, once it is determined that a request will be successfully performed but it must be completed (as must any copying to mirror NVRAM of the partner in a cluster configuration) before the result of the request is returned to the requesting client.

B. Storage Operating System

The storage operating system 230 implements a file system that logically organizes information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the storage operating system 230 associated with each volume is, for example, the NetApp® Data ONTAP™ operating system available from Network Appliance, Inc. of Sunnyvale, Calif. that implements a Write Anywhere File Layout (WAFL) file system. The preferred storage operating system for the exemplary filer is now described briefly. However, it is expressly contemplated that the principles of this invention can be implemented using a variety of alternate storage operating system architectures.

Figure 3:
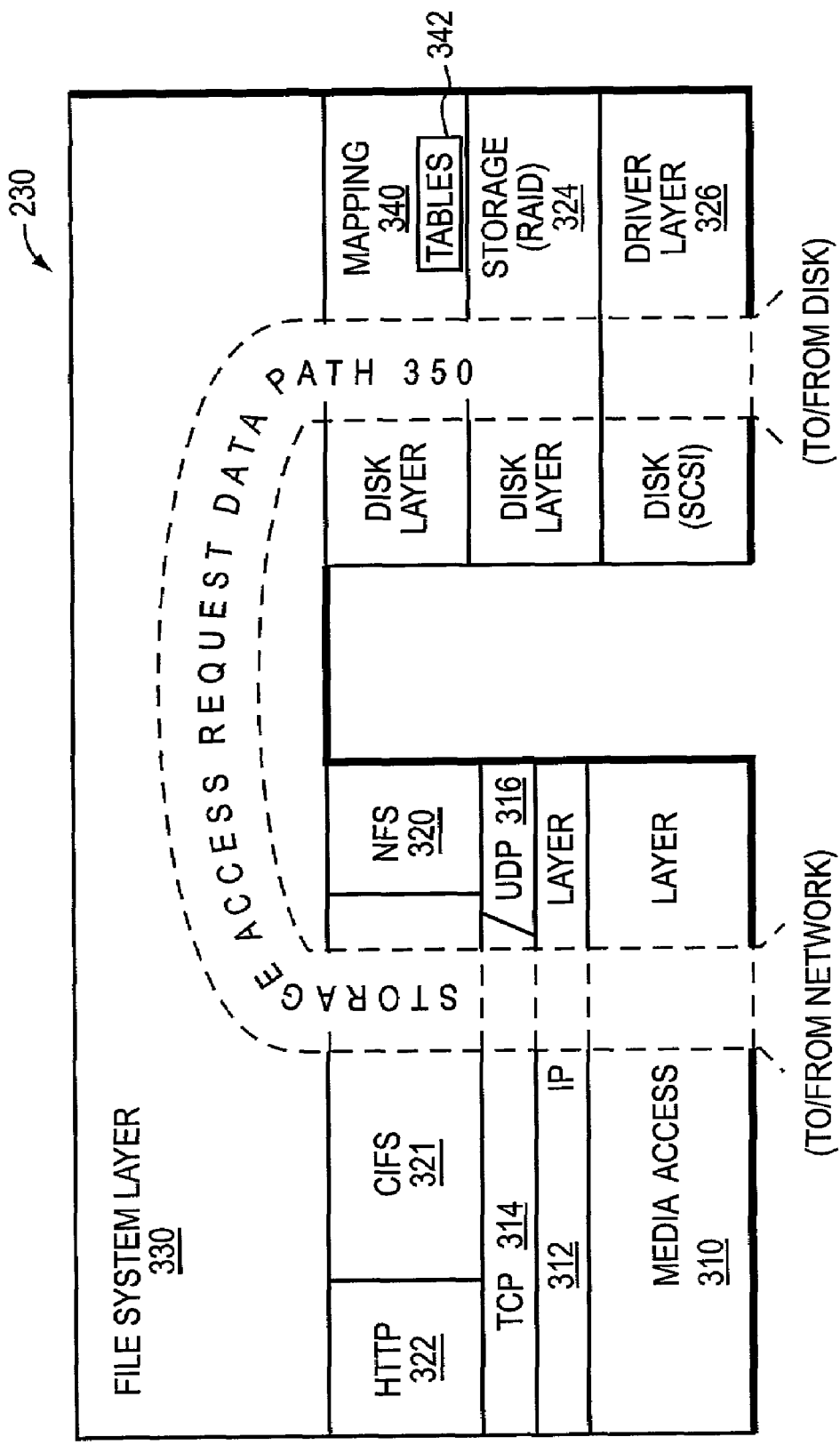
FIG. 3 is a schematic block diagram of an exemplary storage operating system.

As shown in FIG. 3, the storage operating system 230 comprises a series of software layers, including a media access layer 310 of network drivers (e.g., an Ethernet driver). The storage operating system 230 further includes network protocol layers, such as the IP layer 312 and its TCP layer 314, and UDP layer 316. A file system protocol layer provides multi-protocol data access and, to that end, includes support for the CIFS protocol 321, the Network File System (NFS) protocol 320 and the HTTP protocol 322. In addition, the storage operating system 230 includes a disk storage layer 324 that implements a disk storage protocol, such as a RAID protocol, and a disk driver layer 326 that implements a disk access protocol such as, e.g., a Small Computer Systems Interface to (SCSI) protocol.

Bridging the disk software layers with the network and file system protocol layers is a file system layer 330 of the storage operating system. Generally, the layer 330 implements a file system having an on-disk format representation that is block-based using, e.g., 4-kilobyte (KB) data blocks and using Modes to describe the files. In response to is transaction requests, the file system generates operations to load (retrieve) the requested data from volumes 122 (see FIG. 1) if it is not resident "in-core", i.e., in the filer's memory 224. If the information is not in memory, the file system layer 330 indexes into the Mode file using the Mode number to access an appropriate entry and retrieve a logical volume block number. The layer 330 then passes the logical volume block number to the disk storage (RAID) layer 324, which maps that logical number to a disk block number and sends the latter to an appropriate driver (for example, an encapsulation of SCSI implemented on a fibre channel disk interconnection) of the disk driver layer 326. The disk driver accesses the disk block number from volumes 122 and loads the requested data in memory 224 for processing by the filer 110. Upon completion of the request, the filer (and storage operating system) returns a reply, e.g., a conventional acknowledgement packet defined by the CIFS specification, to the client 104, 140 over the network 102.

It should be noted that the software "path" 350 through the storage operating system layers described above needed to perform data storage access for the client request received at the filer may alternatively be implemented in hardware or a combination of hardware and software.

According to an illustrative embodiment of this invention, the storage operating system 230 has additional software layers, such as a disk mapping layer 340 for mapping an individual volume to a specified network address. The disk mapping layer 340 includes mapping tables 342, which, when used by various processes (not shown) within the disk mapping layer facilitate the association of the network address with a storage device affiliated with the storage system. The disk mapping layer 340 controls the assignment of IP addresses to particular volumes or disks in accordance with the procedures described below.

C. IP Volumes

As used in this description an IP volume is a volume, individual disk or group of disks that is associated with a network address in accordance with this invention. By "network address" it is meant any method of identifying a networked computer or file server over a networking architecture. An Internet Protocol (IP) address is used in this description for exemplary purposes only. It is expressly contemplated that other forms of network addressing schemes and associated address structures can be used in accordance with the teachings of this invention without deviating from the spirit or scope of the invention. As such, the term "IP address" should be taken to include any acceptable network address format.

Figure 4:
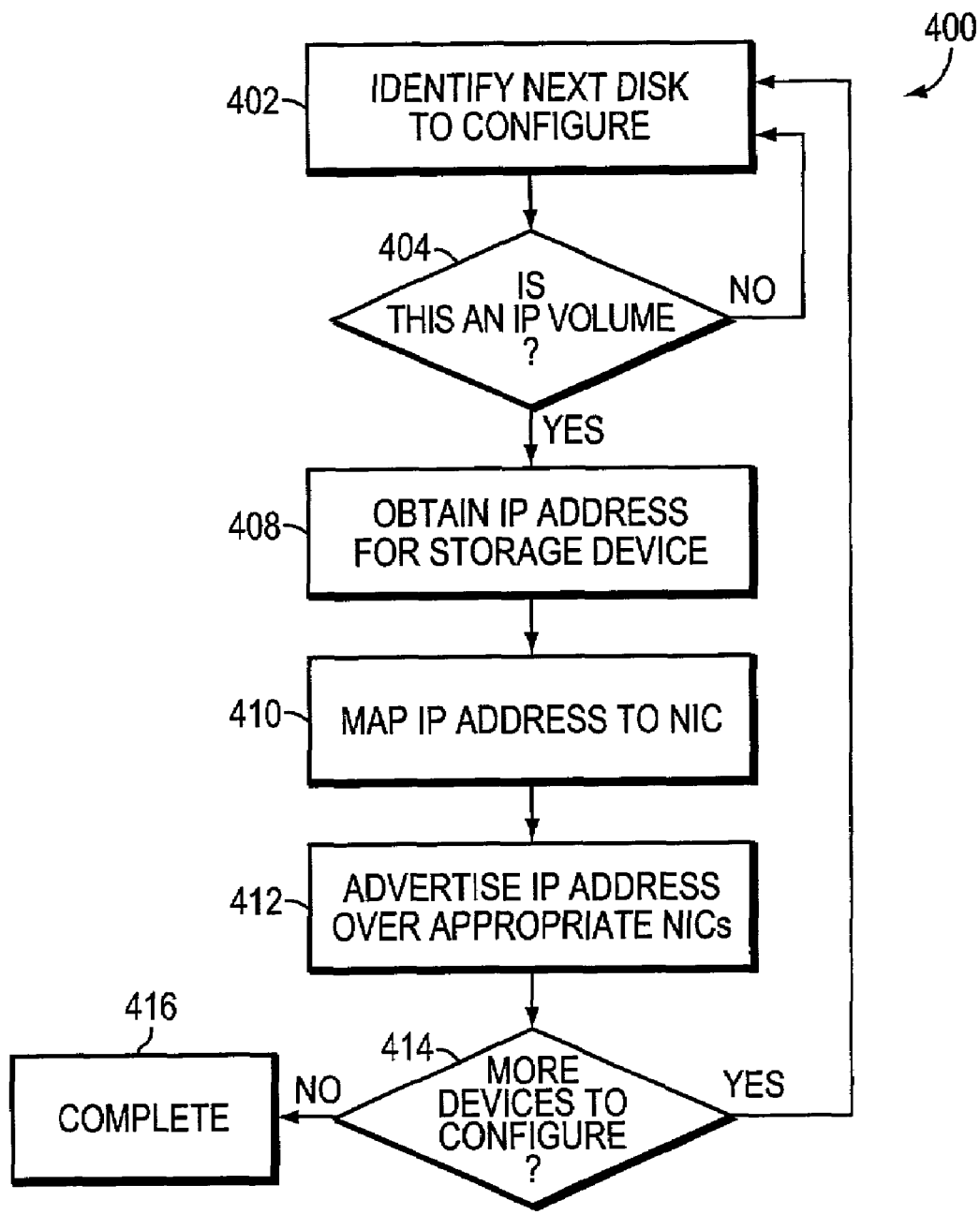
FIG. 4 is a flowchart of the process to configure volumes as IP volumes in accordance with the invention.

FIG. 4 is a flow chart detailing the procedure that the storage operating system, specifically the disk mapping layer, performs in response to a command to configure disks associated with a particular file server. In step 402, the disk mapping layer identifies the next disk to configure. The disk mapping layer then determines if the identified disk is an IP volume (step 404). The status of a particular volume (IP volume or not) can be stored in a variety of locations. The disk mapping layer contains a number of tables 342, which can be used to identify IP volumes. In the illustrative embodiment, this information (i.e., whether a particular volume is an IP volume or not) is physically stored on the disks that comprise the volume. This status information is stored in a protected area of each disk. In one embodiment, the information is stored in a protected disk block, arbitrarily called Sector S. Sector S is also used to store definitive ownership information about a disk in some implementations. Sector S can be implemented at the so-called Sector 0 in certain well-known disk implementations. The use of Sector S for storing ownership information is further described in U.S. patent application Ser. No. 10/027,427 entitled SYSTEM AND METHOD OF IMPLEMENTING DISK OWNERSHIP IN NETWORKED STORAGE by Susan M. Coatney et al, the teachings of which are hereby incorporated by reference. By "ownership" it is meant that the owning device (i.e. a filer) is responsible for servicing the data contained on the disks. In certain embodiments, only the filer that owns a disk may write to that disk.

If the disk is not an IP volume, the disk mapping layer branches back to step 402 to identify the next disk to configure. If the disk is an IP volume the disk mapping layer obtains an IP address for the storage device (step 408). This IP address is obtained through conventional methods that depend on the particular network administration. In one embodiment, each filer will be assigned a series of IP addresses for use with IP volumes that it manages. In an alternate embodiment, the IP addresses for a particular volume is stored in the volume either as an address or as a resolvable name. The resolvable name can be resolved to an appropriate IP address through an appropriate name resolution service such as, e.g. the domain naming service (DNS).

Then, in step 410, the IP address for the storage device is mapped to a network interface controller (NIC). This mapping occurs within the filer. After the address is mapped to a NIC, in an illustrative embodiment, the machine address code (MAC) associated with the NIC will respond to the mapped IP address. In an alternate embodiment, a NIC could be programmed with a new MAC address that corresponds to the IP address that corresponds to the IP address. It should also be noted that the teachings of the present invention are compatible with any suitable methodology of binding an IP address to a NIC.

In step 412 the IP address is then advertised over the appropriate NICs. This advertising can be accomplished through the use of the Address Resolution Protocol (ARP). ARP is further described in *Request For Comments (RFC) 826: An Ethernet Address Resolution Protocol*, published by the Internet Engineering Task Force (IETF), which is incorporated herein by reference. In an alternate embodiment, a route to the volume's IP address is advertised instead of the volume's IP address. Such a route to be advertised could include, for example, the network address of the filer. An advertisement of a route to a particular volume's IP address can be broadcast using standard routing topology protocols. Other network devices, such as switches and routers, will, in response to receipt of such routing topology information, direct packets addressed to the volume's IP address to the filer for further routing to the volume.

The disk mapping layer then determines if more devices exist that need to be configured in step 414. If more disks are to be configured the process returns to step 402. Otherwise, the configuration is complete (step 416).

Figure 5:
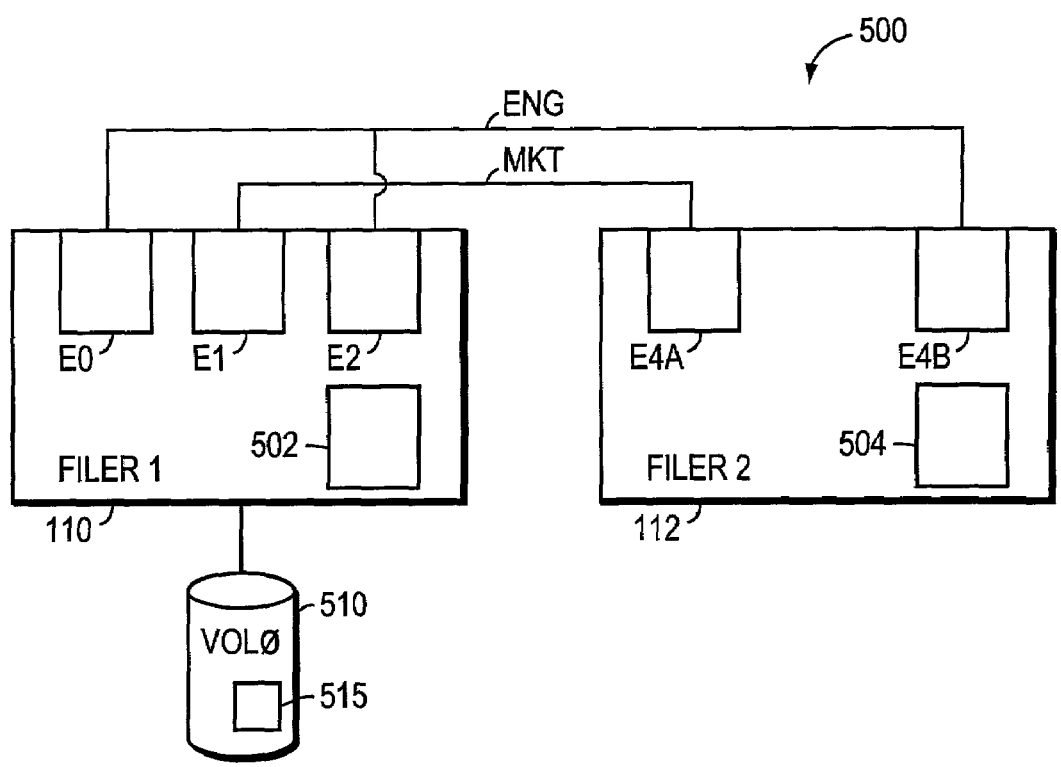
FIG. 5 is a schematic block diagram of an exemplary network environment in which the principles of the present invention are performed.

FIG. 5 is a block schematic diagram of an exemplary embodiment of the invention. In the exemplary network environment 500, there is a Filer 1 110 and a Filer 2 112 connected via two network connections arbitrarily called ENG and MKT. These can be representative of an engineering group (ENG) within an enterprise and a marketing group (MKT). Each group requires certain data and may be assigned particular storage volumes associated with that data. Connected to Filer 1 is a volume of disks 510. In this example, Filer 1 includes three separate network interface controllers/controllers (NICs), namely E0, E1 and E2. Filer 2 has NICs E4A and E4B. In this illustrative embodiment NICs E0 and E2 from Filer 1 and E4B from Filer 2 are connected to the ENG network. Similarly, NIC E1 from Filer 1 and NIC E4A from global Filer 2 are connected to the MKT network. Filer 1 110 also includes an interface mapping table 502. Similarly, Filer 2 112 includes interface mapping table 504.

Figure 6:
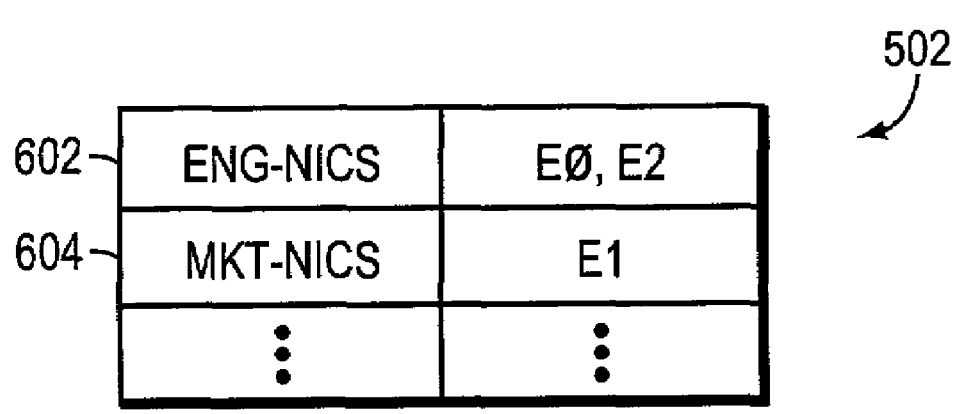
FIG. 6 is a block diagram of a logical interface mapping table in accordance with the present invention.

FIG. 6 is an illustrative logical interface-to-physical interface mapping table 502 from Filer 1 from FIG. 5. The table 502 includes illustrative entries 602 and 604. For example entry 602 shows that the logical name ENG-NICS is affiliated with NICs E0 and E2. Similarly entry 604 shows that the logical name MKT-NICS is affiliated with NICs E1.

Figure 7:
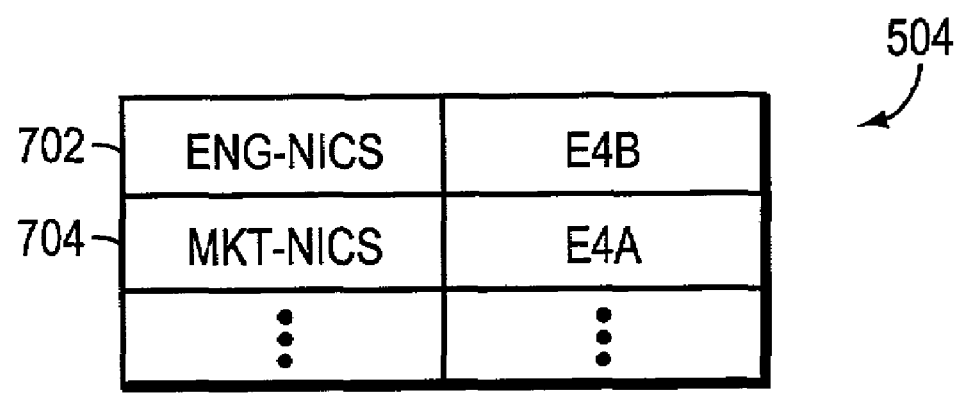
FIG. 7 is a block diagram of a logical interface mapping table in accordance with the present invention.

Similarly, FIG. 7 is an illustrative logical interface-to-physical interface mapping table 504 from filer 2 of FIG. 5. Entry 702 shows that the logical name ENG-NICS is affiliated with E4B. Similarly, logical name MKT-NICS is affiliated with the NIC E4A. The user or administrator typically constructs these interface mapping tables.

For example, if the IP address of vol 0 (510) is 1.2.3.4 and vol 0 belongs on the ENG subnet, Filer 1 would advertise the fact that the IP address of vol 0 is 1.2.3.4 over ENG-NICs. By using the table 502, the filer would translate ENG-NICs into NICs E0 and E2. By using the logical name ENG-NICS, the administrator does not need to worry about the actual device names of NICS on each filer. Each volume can be assigned to a logical name, for example ENG for engineering or MKT for marketing, with the appropriate mapping done at each filer through the use of the interface mapping tables 502 and 504. Thus, if vol 0 was move from Filer 1 to Filer 2, the logical name that describes where the volume is to be advertised would remain the same (i.e., ENG-NICS), but the mapping would change. In this example, Filer 2 would map ENG-NICS to NIC E4B.

Figure 8:
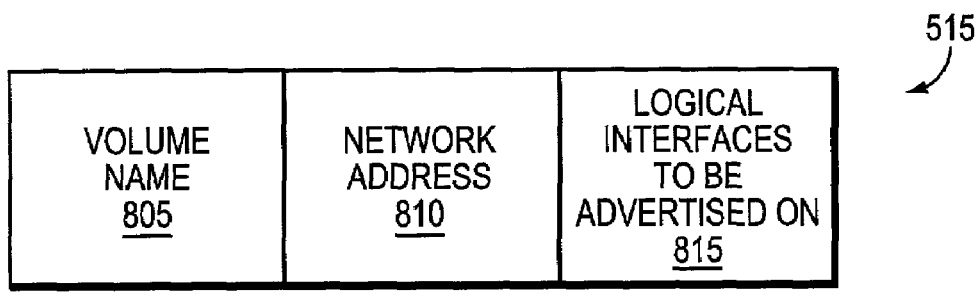
FIG. 8 is a block diagram of an exemplary on-volume table.

Exemplary volume vol 0 (510) is connected to Filer 1 (110). This connection can be a direct wired connection or can be accomplished through a switching fabric. For example, a Fibre Channel fabric comprised of interconnected switches. In the illustrative embodiment, vol 0 (510) includes an address to logical interface table 515. This on-volume table 515 is stored on the physical disks that comprise the volume. It can be stored in Sector S or in another suitable reserved location on the disks. FIG. 8 is a block diagram on an exemplary on-volume IP address to logical interface mapping table 515. The mapping table 515 includes fields such as an optional volume name field 805, a network address field 810 and a list of logical names describing a set of NICs that the volume should be advertised over 815.

By storing the logical name of NICs which will advertise a volume on the disks comprising the volume, no physical device names need to be stored on the volume. This improves mobility of volumes and disks. By moving a volume from one filer to another, several advantageous results can be achieved, including load balancing and improved uptime. Also, clients accessing data stored on an IP volume only have to know the IP address of the volume. The actual filer managing the volume can be changed without affecting the clients. The name of the data (for example 1.2.3.4:C:/foo/bar/file.doc), will remain constant. As the volume is transferred from filer to filer, the IP address to MAC address mapping will be changing to correspond to the appropriate NIC of the filer that is actually managing the volume, but the IP address will not change.

Figure 9:
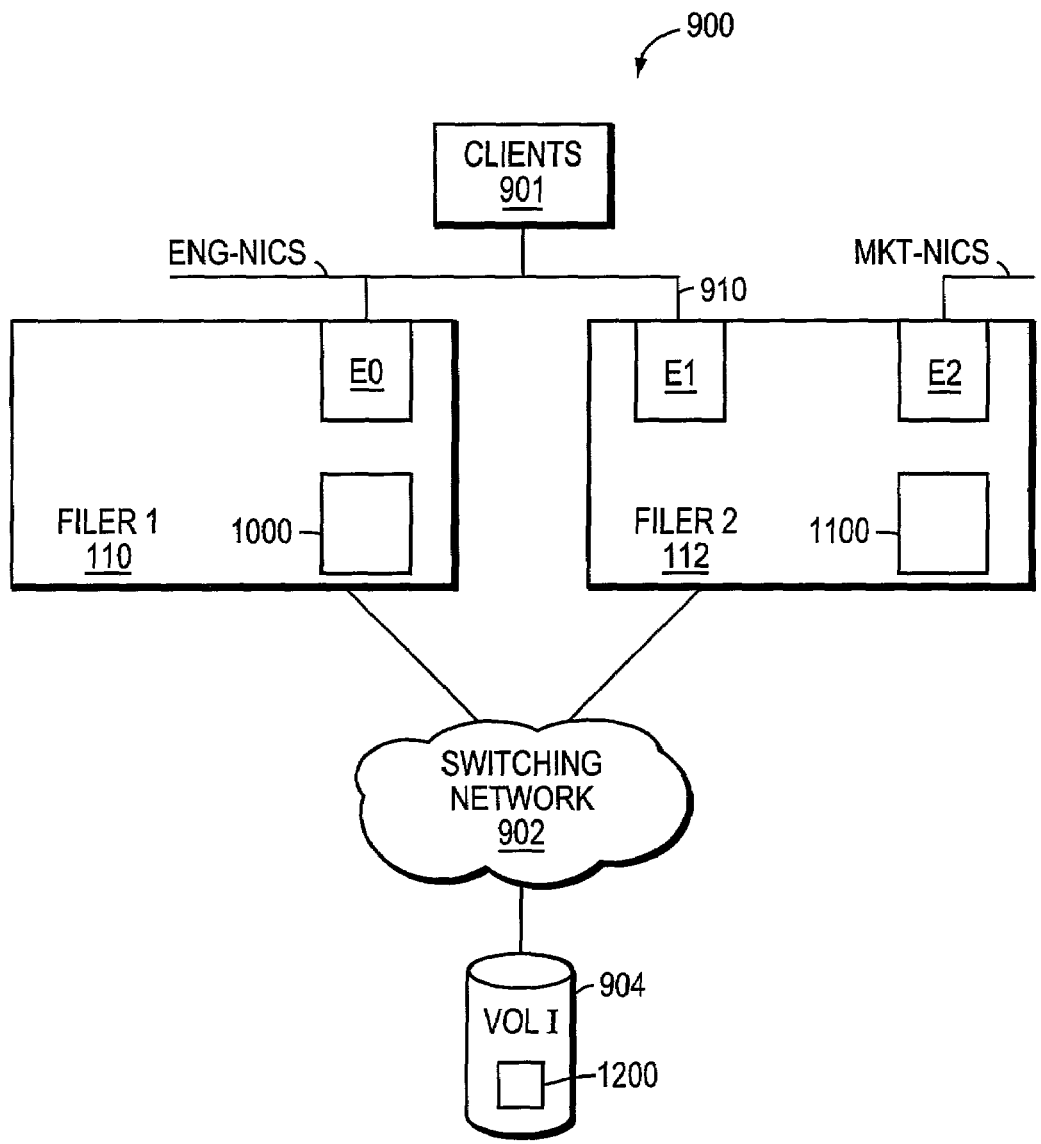
FIG. 9 is a block diagram of an exemplary network environment showing an IP volume connected to a switching network.

FIG. 9 is an exemplary network environment 900 in which the principles of the present invention can be practiced. An advantageous feature of the present invention is the ease that volumes can be transferred in a storage area network (SAN). This environment 900 includes a number of clients 901 connected to a network 910. Filer 1 (110) and Filer 2 (112) are connected to a switching network 902. Vol 1 (904) is also connected to the switching network 902.

Figure 10:
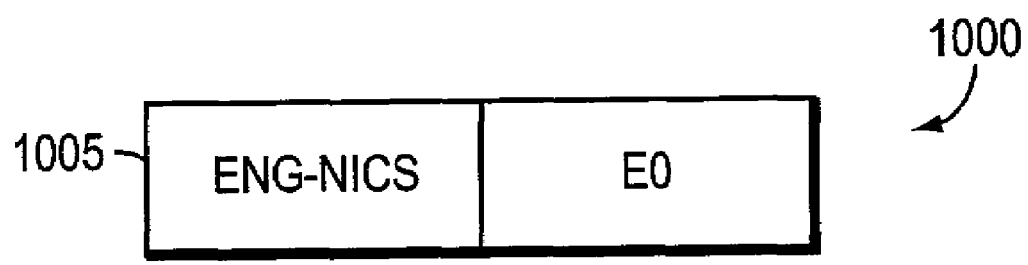
FIG. 10 is a block diagram of an exemplary logical interface mapping table in accordance with the present invention.
Figure 11:
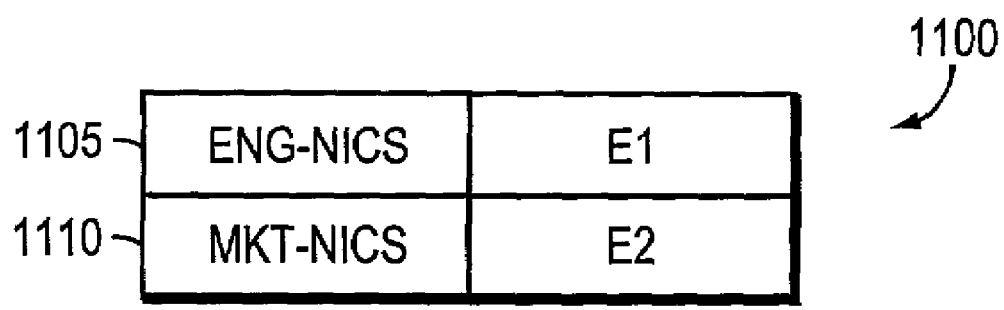
FIG. 11 is a block diagram of an exemplary logical interface mapping table in accordance with the present invention.

Filer 1 (110) has NIC E0, while Filer 2 (112) has NICS E1 and E2. In accordance with the illustrative embodiment of this invention, Filer 1 (110) and Filer 2 (112) contain logical interface-to-physical interface mapping tables 1000 and 1100 respectively. Vol 1 (904) includes an IP address-to-logical interface mapping table 1200. FIG. 10 is a schematic block diagram of the interface mapping table 1000 associated with Filer 1 (110). The table 1000 has an entry 1005 that shows that the ENG-NICS logical name should be mapped to NIC E0 on Filer 1. Similarly, FIG. 11 is a block diagram of interface mapping table 1100 associated with Filer 2 (112). Entry 1105 shows that the logical name ENG-NICS should be mapped to NIC E1 on Filer 2. Likewise, the entry 1110 shows that the MKT-NICS logical name should be mapped to NIC E2.

Figure 12:
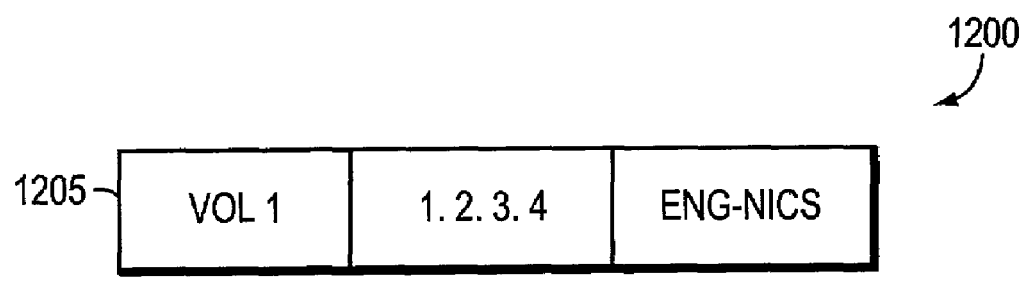
FIG. 12 is a block diagram of an exemplary network address to logical name mapping table in accordance with the present invention.

The IP address-to-logical name mapping table 1200, located in volume 904, is shown in block form in FIG. 12. The entry 1205 identifies this volume as being named "Vol 1," and as having an IP address of 1.2.3.4 This volume should be advertised over the ENG-NICS logical name.

If, for example, Filer 1 (110) owned volume 1 (904), Filer 1 would map the IP address 1.2.3.4, obtained from the on disk mapping table 1200 to the NIC E0. The ownership of vol 1 can be transferred from Filer 1 to Filer 2 using known mechanisms or techniques. One technique is described in U.S. patent application Ser. No. 10/027,020 by Joydeep Sen Sarma et al entitled SYSTEM AND METHOD FOR TRANSFERRING VOLUME OWNERSHIP IN NETWORK STORAGE, which is hereby incorporated by reference. Volume ownership could be transferred to achieve, for example, load balancing among a group of file servers. If Filer 2 (112) obtained ownership of Volume 1 (904), Filer 2 would utilize its interface mapping table 1100 to resolve the ENG-NICS logical name to NIC E1. Filer 2 (112) would then advertise Volume 1 over NIC E1 as being associated with IP address 1.2.3.4.

The foregoing has been a detailed description of the invention. Various modifications and additions can be made without departing from the spirit and scope of this invention. Furthermore, it expressly contemplated that the processes shown and described according to this invention can be implemented as software, consisting of a computerreadable medium including program instructions executing on a computer, as hardware or firmware using state machines and the alike, or as a combination of hardware, software and firmware. While this description has been written in terms of Internet Protocol addresses, it is expressly contemplated that any form of network address can be utilized in accordance with the teachings of this invention. Accordingly, this description is meant to be taken only by way of example and not to otherwise limit the scope of this invention.

What is claimed is:

1. A method, comprising:

configuring a cluster from a plurality of servers each server of the plurality of servers managing one or more storage devices;

assigning an IP address to each storage device, connecting a storage device, having an assigned IP address to a first server of the plurality of servers, said first server managing said storage device;

connecting the remaining storage devices, having assigned IP addresses, to a second server, said second server managing the remaining storage devices;

storing a first table on each storage device, storing an association between the IP address and a logical name said logical name describing a set of network interface controllers that the IP address of the storage device should be advertised over, and the first table is stored in a predetermined location on the storage device that is accessible by other servers connected to the network, and wherein the logical name describing the set of network interface controllers is a group set by an administrator for assigning network interface controllers to a certain group of clients;

storing a second table on the first server, storing an association between the logical name and one or more network interface controllers;

advertising the IP address of the storage device over appropriate network interface controllers of the first server; and configuring one or more clients, to address data access requests to a storage device using the IP address of the storage device, that relates to the logical name being accessed by said client.

2. The method of claim 1, further comprising:

mapping the IP address of the storage device to a MAC address of a first network interface controller of the first server.

3. The method of claim 2, further comprising:

in response to a failure of the first server, assigning the IP address of the storage device to a second network interface controller on a second server, wherein the-second network interface controller has the same logical name as the first network interface controller.

4. The method as in claim 1, further comprising:

obtaining the IP address for the storage device from a domain name service (DNS).

5. The method as in claim 1, further comprising:

having a series of IP addresses assigned to the first server;

selecting one of the series of IP addresses as the IP address for the storage device.

6. The method of claim 1 further comprising:

changing the server that is managing a particular storage device to a second server, and the transfer of said storage device, being transparent to the client.

7. A system, comprising:

a plurality of servers connected together to form a cluster;

a plurality of storage devices, each storage device having an assigned IP address;

a storage device connected to a first server of the plurality of servers, the storage device configured to store a first table, said first table storing an association between the IP address of the storage device and a logical name, said logical name describing a set of network interface controllers that the IP address of the storage device should be advertised over;

a first server configured to store a second table, said second table storing an association between the logical name and one or more network interface controllers of the first server; and the first server further configured to advertise the IP address of the storage device over appropriate network interface controllers of the first server; and a client configured to request access to the storage device using the IP address of the storage device.

8. The system of claim 7, wherein the first server is further configured to map the IP address of the storage device to a MAC address of a first network interface controller of the first server.

9. The system of claim 8, further comprising:

in response to a failure of the first server, a second server configured to manage the storage devices of the first server and to assign the respective IP addresses of such storage devices to one or more second network interface controllers on the second server, wherein the second network interface controllers have the same logical name as the first network interface controller.

10. The system of claim 7, wherein the logical name describing the set of network interface controllers is a group set by an administrator for assigning network interface controllers to a certain group of clients.

11. The system as in claim 7, wherein the IP address for the storage device is obtained from a domain name service (DNS).

12. The system of claim 7, wherein the predetermined location is sector 0 on the storage device, and is a location on the disk where data is not stored.

13. A system comprising computer executable instructions in a computer readable medium for managing a clustered storage system, the system comprising:

means for configuring a cluster from a plurality of servers, and a plurality of storage devices, the storage devices containing data that is accessible to one or more clients;

means for assigning an IP address to each storage device;

means for connecting one or more storage devices, each being assigned an IP address, to a first server;

means for connecting the remaining storage devices, each being assigned its own IP address, with a second server, said first and second servers each having access to the other servers storage devices;

means for configuring said first server with two or more network interface controllers, each controller being assigned to a group having a logical name;

means for configuring said second server with two or more network interface controllers, each controller being assigned to a group having a logical name;

memory means for storing a first table on each storage device, said first table for storing an association between respective IP addresses of each storage device and logical name describing a set of network interface controllers that IP addresses of the storage device should be advertised over;

memory means for storing a second table on the first server, said second table for string an association between each the logical name and one or more network interface controllers;

means for advertising the IP address of one or more storage devices over one or more network interface controllers; and means for configuring one or more clients to address data access requests to storage devices, using the IP address of the storage devices.

* * * * *